May 28, 1929. N. T. FINN 1,714,770
ROPE HOLDING CLIP
Filed March 26, 1928
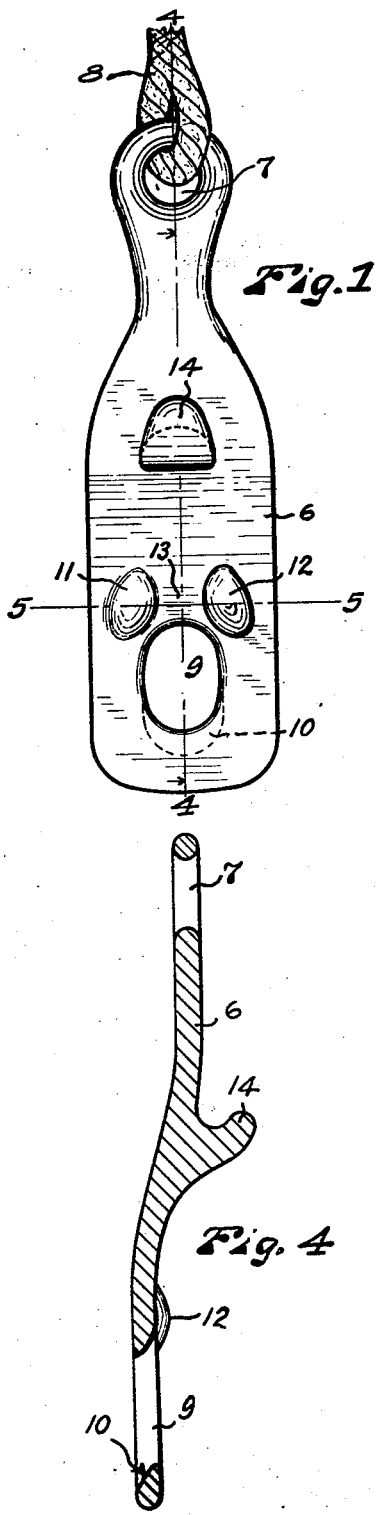
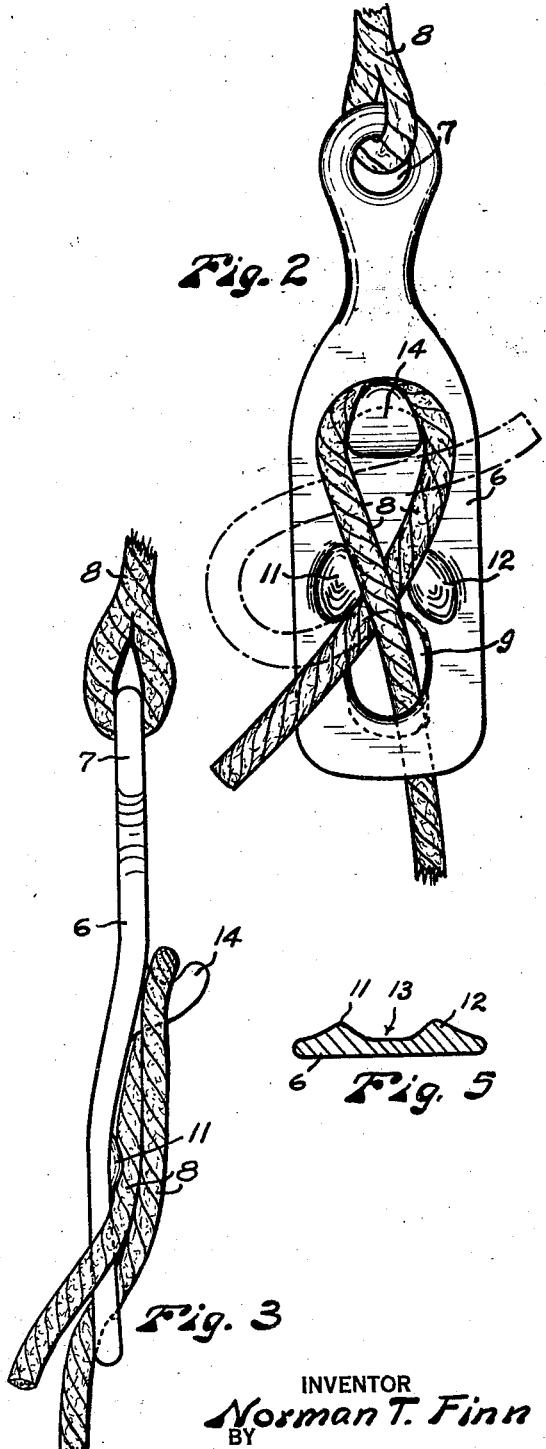
INVENTOR
Norman T. Finn
BY
Fred C. Matheny
ATTORNEY Patented May 28, 1929.

1,714,770

UNITED STATES PATENT OFFICE.

NORMAN T. FINN, OF EVERETT, WASHINGTON.

ROPE-HOLDING CLIP.

Application filed March 26, 1928. Serial No. 264,694.

My invention relates to improvements in rope holding clips and the object of my invention is to provide a metal clip of strong, simple and efficient construction with which a rope or similar flexible connector under tension may be quickly and easily engaged in such a manner as to securely hold said rope and yet leave said rope readily disengageable from the clip.

Another object is to provide a rope holding clip of this nature which is relatively flat, which is comparatively light in weight and which takes up very little room.

Further objects are to provide a clip which will save time and labor by obviating the tying and untying knots and to provide a clip which is especially designed to hold a rope securely so long as the rope is under tension, and to provide a clip from which a rope under tension may be manually released very easily.

This clip may be permanently secured to one end of a flexible connector, as a luggage rope, which is adapted to be drawn tightly around a commodity and to have its other end releasably and adjustably secured to said clip or this clip may be used in any other manner to hold a rope under tension.

Other and more specific objects will be apparent from the following description taken in connection with the accompanying drawings. In the accompanying drawings, Figure 1 is a front view of a rope holding clip constructed in accordance with my invention.

Fig. 2 is a similar view of said clip showing a rope operatively engaged therewith.

Fig. 3 is an edge view of the clip showing the rope engaged therewith.

Fig. 4 is a longitudinal section on broken line 4—4 of Fig. 1.

Fig. 5 is a cross section on broken line 5—5 of Fig. 1.

Referring to the drawings, throughout which like reference numerals designate like parts, I show a rope holding clip embodying a flat body portion 6, provided at one end with a ring 7 within which one end of a flexible connector, as a rope 8, may be permanently secured. The other end of the flat body portion 6 is provided with a perforation or eye 9 which is undercut on the rear side of said body portion as at 10 and the edges of which are rounded so that they will not tend to cut a rope. Two lugs or humps 11 and 12 are provided on the front of the body portion 6 near the inner end of the perforation 9 and on opposite sides of the center, said humps leaving a depression 13 between them within which the rope may lie. An integral hook 14 is provided on the front side of the body member 6 midway between the two sides and at a substantial distance above the perforation 9, the curve of the hook being directed away from the perforation 9. That portion of the body member between the hook 14 and the perforation 9 is inclined rearwardly so that the end of the body member in which the perforation 9 is located lies in a plane to the rear of the portion which carries the hook 14. This causes the rope to bind more tightly and hold more firmly when under tension, as hereinafter explained.

In securing the loose end of a rope 8 to this clip, the end of said rope is thrust through the perforation 9 from the back toward the front, the rope 8 is drawn tight around or over whatever is to be fastened with said rope, and the rope is then passed over the hook 14 with the loose end of the same underneath that portion of the rope which is under tension, said loose end and the tension portion of the rope crossing each other at the location of the depression 13 and between the knobs 11 and 12 and binding upon each other at this location in such a manner that the rope can not be loosened from the clip by tension. As soon as tension on the rope is released or slackened the rope may be very quickly and easily slipped off the hook 14, and will be entirely free. The process of attaching the rope is equally quick and easy, the end being thrust through the perforation 9 and drawn tight, then doubled to form a bight, then given a partial twist and hooked over the hook 14 with the loose end extending between the knobs 11 and 12 and underneath the portion of the rope that is under tension. The lugs 11 and 12 form a natural depression therebetween for the loose end of the rope and prevent sidewise displacement of said end, and further cooperate in holding said loose end when the other portion of the rope is drawn tightly thereover. The hook 14, is relatively short so that the rope may be easily released therefrom manually, said hook being just long enough to hold the rope without releasing the same when the rope is under tension.

The clip is relatively flat and takes up very little room. Said clip is not heavy and may be conveniently attached to one end of a rope which is to be fastened around luggage or any other commodity.

In Fig. 2 I show, by dotted lines, a manner in which the loose end of the cable 8 may be turned back and inserted through that part of the loop of said cable which lies between the hook 4 and the knobs 11 and 12, said end passing under the overlying part of the cable and over the underlying part of the cable, as shown, in such a manner that the cable may be very quickly and easily released by exerting a pull on the loose end of the same.

Obviously the clip may be made in various sizes to suit the requirements of the cable that is being used and the precise shape of the clip may be varied without varying the principle of the same.

The foregoing description and accompanying drawings clearly disclose a preferred embodiment of my invention, but it will be understood that this disclosure is merely illustrative and that such changes in the same may be made as are within the scope and spirit of the following claims.

I claim:

1. A rope holding device embodying a flat body member having a perforation near one end through which a rope may be passed, a hook rigid with the body member at a distance from the perforation and curved in a direction away from said body member and two spaced apart knobs projecting from the side of the body member near the inner end of the perforation.

2. The apparatus as described in claim 1 in which that portion of the body member in which the perforation is provided is offset rearwardly relative to the plane of the portion which carries the hook.

3. A rope holding device embodying a flat body member having a perforation near one end through which a rope may be passed, a hook rigid with the body member at a distance from the perforation and curved in a direction away from said body member and arranged to have the rope looped thereover with the free end of the rope drawn underneath the tension portion thereof and two spaced apart lugs disposed near said perforation between the perforation and the hook and forming a depression therebetween, the two portions of said rope crossing each other between said knobs.

4. A rope holding device embodying a flat body member formed of two end sections disposed in relatively offset planes and connected by a relatively inclined portion, said end sections each having perforations formed therein, a hook extending outwardly from the body member on one side near said inclined portion and curved in a direction away from said inclined portion, a rope permanently engaged in the perforation of the end whereon said hook is located, the other perforation being arranged to have the loose end of a rope thrust therethrough and then doubled to form a bight which is placed over said hook, the loose end of the rope being passed between the body member and the tension portion of said rope.

5. A rope holding device embodying a flat body member formed of two end sections disposed in relatively offset planes and connected by a relatively inclined portion, said end sections each having perforations formed therein, a hook extending outwardly from the body member on one side near said inclined portion and curved in a direction away from said inclined portion, a rope permanently engaged in the perforation of the end whereon said hook is located, two knobs projecting from said body member near said other perforation in spaced apart relation leaving a depression therebetween, said other perforation being arranged to have the loose end of a rope thrust therethrough and then doubled to form a bight which is placed over said hook, the loose end of the rope passing through said depression and lying between said body member and the tension portion of said rope the two portions of said rope crossing between said knobs.

The foregoing specification signed at Seattle, Wash., this 15th day of Mar. 1928.

NORMAN T. FINN.